United States Patent
Lenz et al.

(10) Patent No.: US 10,618,231 B2
(45) Date of Patent: Apr. 14, 2020

(54) METHOD FOR PRODUCING A STRUCTURAL ELEMENT CONSISTING OF A FIBRE-COMPOSITE HOLLOW PROFILE AND LOAD-INTRODUCING ELEMENT, AND STRUCTURAL ELEMENT

(71) Applicant: Leichtbau-Zentrum Sachsen GmbH, Dresden (DE)

(72) Inventors: Florian Lenz, Dresden (DE); Bernhard Witschel, Dresden (DE); Martin Lepper, Dresden (DE)

(73) Assignee: Leichtbau-Zentrum Sachsen GmbH, Dresden (DE)

( * ) Notice: Subject to any disclaimer, the term of this patent is extended or adjusted under 35 U.S.C. 154(b) by 0 days.

(21) Appl. No.: 16/074,088

(22) PCT Filed: Jan. 23, 2017

(86) PCT No.: PCT/EP2017/051326
§ 371 (c)(1),
(2) Date: Jul. 31, 2018

(87) PCT Pub. No.: WO2017/137242
PCT Pub. Date: Aug. 17, 2017

(65) Prior Publication Data
US 2019/0202147 A1    Jul. 4, 2019

(30) Foreign Application Priority Data
Feb. 10, 2016    (DE) .......................... 10 2016 202 012

(51) Int. Cl.
*B29C 70/00*     (2006.01)
*B29C 53/00*     (2006.01)
(Continued)

(52) U.S. Cl.
CPC ............ *B29C 70/52* (2013.01); *B29C 70/545* (2013.01); *B29C 70/86* (2013.01); *B29C 53/56* (2013.01);
(Continued)

(58) Field of Classification Search
CPC .................................................. B29K 2101/10
(Continued)

(56) References Cited

U.S. PATENT DOCUMENTS 2,731,067 A * 1/1956 Miller .................... B29C 31/002
156/190
5,225,021 A * 7/1993 Lona .................... B29C 37/0032
156/171
2015/0013819 A1   1/2015 Stewart

FOREIGN PATENT DOCUMENTS

DE    102012201262 A1    8/2013
DE    102014004158 A1    9/2015
(Continued)

*Primary Examiner* — Linda L Gray
(74) *Attorney, Agent, or Firm* — Michael Soderman

(57) ABSTRACT

A method for producing a structural element (14) that comprises a hollow profile (1) made of continuous fibre-reinforced plastics material and a load-application element (15) is based on providing a hollow profile (1) on a liner (2), wherein the hollow profile (1) is impregnated by heating it to a temperature that is equal to or above the softening temperature of the matrix material (9) and below its cross-linking temperature, removing the liner (2) in an inner region (17) of the hollow profile (1), where the load-application element (15) is arranged, and consolidating and functionalising the structural element (14) by heating it to a temperature that is equal to or above the cross-linking temperature of the matrix material (9) and by applying a radially inwardly acting pressure to the structural element (14). The hollow profile (1) is moulded onto the load-application element (15) in a form-fitting manner.

20 Claims, 4 Drawing Sheets

(51) Int. Cl.
*B29C 70/52* (2006.01)
*B29C 70/86* (2006.01)
*B29C 70/54* (2006.01)
B29C 53/82 (2006.01)
B29C 53/56 (2006.01)
B29K 101/10 (2006.01)
B29L 23/00 (2006.01)

(52) U.S. Cl.
CPC ........ *B29C 53/824* (2013.01); *B29K 2101/10* (2013.01); *B29L 2023/00* (2013.01); *Y10T 156/1064* (2015.01); *Y10T 156/1082* (2015.01)

(58) Field of Classification Search
USPC ........................................................ 156/432
See application file for complete search history.

(56) References Cited

FOREIGN PATENT DOCUMENTS

WO       2009112017 A2   9/2009
WO       2015172994 A1   11/2015

\* cited by examiner

METHOD FOR PRODUCING A STRUCTURAL ELEMENT CONSISTING OF A FIBRE-COMPOSITE HOLLOW PROFILE AND LOAD-INTRODUCING ELEMENT, AND STRUCTURAL ELEMENT

CROSS REFERENCE TO RELATED APPLICATIONS

This application is the U.S. national stage of International Application No. PCT/EP2017/051326, filed on 2017 Jan. 23. The international application claims the priority of DE 102016202012.9 filed on 2016 Feb. 10; all applications are incorporated by reference herein in their entirety.

BACKGROUND

The invention relates to a method for producing structural elements that comprise a hollow profile made of continuous fibre-reinforced plastics material comprising a thermosetting matrix, and at least one load-application element, and to a structural element of this kind.

In particular in the case of obvious load paths, as exist for example in the case of diagonal ties/struts, torsional shafts and pressure lines, fibre-composite profiles have a number of advantages compared with metal profiles, for example with respect to the rigidity properties thereof and the lower mass thereof. In this case, there are in particular two challenges with regard to using the fibre-composite structures, specifically the configuration of the application of the load to the profile and the integration of the profile into a module, and also efficient and cost-effective manufacture of the profiles.

There are essentially two types of method available for manufacturing fibre-composite profiles comprising a thermosetting matrix: the pultrusion method and piece production, e.g. in the RTM method.

In this case, the pultrusion method allows for continuous, cost-effective manufacture of fibre-composite profiles, but load-application elements that are required have to be introduced retrospectively, for example by means of adhesion technology or by machining the profile. Adhesive connections, i.e. integral connections, between a load-application element and the fibre-composite profile have little resistance to ageing; moreover, checking and quality assurance of the adhesive connection are extremely difficult. The elements disclosed in DE 10 2006 039565 A1, DE 10 2004 021144 A1 or DE 102 49591 A1, in which the load-application elements are adhesively bonded to fibre-composite rods, are suitable only up to a limited load level. Machining of the fibre-composite profile is disadvantageously associated with fibre damage and a deterioration in the mechanical properties.

In the case of piece production, as described in WO 2005/105417 A1 for example, the load-application element can be integrally moulded onto the profile during the manufacturing process, leading to advantageous mechanical properties. However, the method is complex and expensive.

Continuous manufacture of fibre-composite profiles that are intended to be connected to a load-application element, also referred to as functionalisation of the profile, is possible only when the load-application element is retrospectively integrated into the fibre-composite profile. This means that the profile must be formable in order for an integral connection to be established between the fibre-composite profile and the load-application element. This presupposes that it is possible to soften the matrix system during functionalisation.

This is possible in the case of thermoplastic matrix systems. A method for producing structural elements comprising a thermoplastic matrix is described in DE 10 2014 004158 A1. However, in addition to the typical disadvantages such as lower rigidity, higher temperature-sensitivity, poorer chemical resistance and greater water permeability, semifinished products comprising a thermoplastic matrix also often have quality defects compared with semifinished products comprising a thermosetting matrix. Compared with thermosetting matrix systems having a similar glass transition temperature in each case, said semifinished products comprising a thermoplastic matrix generally require higher consolidation pressures and temperatures, making tool systems complex and comparatively expensive.

SUMMARY

The invention relates to a method for producing structural elements (14) that comprise a hollow profile (1) made of continuous fibre-reinforced plastics material that comprises a thermosetting matrix material that has a softening temperature that is below the cross-linking temperature, and at least one load-application element (15), and to a structural element (14) produced by the method and comprising a hollow profile (1) made of continuous fibre-reinforced plastics material that comprises a thermosetting matrix material that has a softening temperature that is below the cross-linking temperature, and at least one load-application element (15), the hollow profile (1) and the load-application element (15) being interconnected in a form-fitting manner. The method according to the invention comprises at least the following method steps:

a. providing a cut-to-size hollow profile (1) made of plastics material (3) that is reinforced by continuous fibres, on a liner (2), wherein the liner (2) forms the inner lateral surface of the hollow profile (1), and wherein the hollow profile (1) is impregnated by means of heating to a temperature that is equal to or above the softening temperature of the matrix material (9) and below the cross-linking temperature of the matrix material (9);

b. removing the liner (2) in the inner region (17) of the hollow profile (1) that is intended for load application;

c. arranging a load-application element (15) on the inner region (17) of the hollow profile (1) that is intended for load application;

d. consolidating and functionalising the structural element (14) consisting of the hollow profile (1) and the load-application element (15) by means of heating the structural element (14) to a temperature that is equal to or above the cross-linking temperature of the matrix material (9) and applying a radially inwardly acting pressure to the structural element (14), wherein the hollow profile (1) is moulded onto the load-application element (15) in a form-fitting manner.

DETAILED DESCRIPTION

The object of the invention is therefore that of overcoming the listed disadvantages of the prior art by describing a method for producing structural elements from a continuous fibre-reinforced plastics hollow profile comprising a thermosetting matrix, and an integrated load-application element, and a structural element produced by the method, which is capable of reducing the production costs by being suitable for mass production.

In order to achieve the object, a method is proposed for producing a structural element comprising a hollow profile made of continuous fibre-reinforced plastics material that comprises a thermosetting matrix material that has a softening temperature that is below the cross-linking temperature, and at least one load-application element, the method comprising at least the following method steps:

a. providing a cut-to-size hollow profile made of plastics material that is reinforced by continuous fibres, on a liner, the liner forming the inner lateral surface of the hollow profile, and the hollow profile being impregnated by means of heating to a temperature that is equal to or above the softening temperature of the matrix material and below the cross-linking temperature of the matrix material;

b. removing the liner in the inner region of the hollow profile that is intended for the load application;

c. arranging a load-application element on the inner region of the hollow profile that is intended for the load application;

d. consolidating and functionalising the structural element consisting of the hollow profile and the load-application element by means of heating the structural element to a temperature that is equal to or above the cross-linking temperature of the matrix material and applying a radially inwardly acting pressure to the structural element, the hollow profile being moulded onto the load-application element in a form-fitting manner.

The proposed method makes it possible, in a particularly advantageous manner, to introduce load-application elements into a thermosetting hollow profile in a form-fitting manner without the mechanical properties of the hollow profile being adversely affected.

In a preferred embodiment of the method according to the invention, providing the hollow profile according to method step a. comprises at least the following method steps:

i. manufacturing a hollow profile from plastics material that is reinforced by continuous fibres, on a liner, the liner forming the inner lateral surface of the hollow profile;

ii. heating the hollow profile to a temperature that is equal to or above the softening temperature of the matrix material and below the cross-linking temperature of the matrix material;

iii. cooling the hollow profile to a temperature below the softening temperature of the matrix material;

iv. cutting the hollow profile to size and removing it from the production line. Various fibre processing methods can be used to manufacture the fibre-composite hollow profile, by means of which methods a reinforcing fibre laminate is applied to a liner.

All known fibres, in particular carbon, glass, aramid, natural, basalt and mixed fibres are possible as reinforcing fibres. In addition, various reinforcing fibre architectures can be used, from uncrossed fibre strands to textile weaves such as braids.

In a preferred embodiment of the method according to the invention, the hollow profile is manufactured by laying continuous fibres or continuous-fibre semifinished products, pre-impregnated with the thermosetting matrix material, on the liner.

In a further preferred embodiment of the method according to the invention, the hollow profile is manufactured in a continuous manner by means of a method similar to pultrusion, the thermosetting matrix material being fed to the continuous fibres laid on the liner.

In a further preferred embodiment of the method, the continuous fibres are laid on the liner in a continuous manner by being drawn off from a creel, the fibre direction being in parallel with the axis of the hollow profile or with the machine direction, and axial reinforcement of the hollow profile being achieved, and/or by means of a braiding wheel and/or a spiralising machine, fibres extending in the non-axial direction and off-axis reinforcement of the hollow profile being achieved.

In a further preferred embodiment of the method according to the invention, the thermosetting matrix material is fed to the continuous fibres by means of powdered resin application or by means of resin injection. The powdered resin application is particularly preferably carried out following each processing step set out above, i.e. following axial laying by means of drawing off from a creel, following laying by means of a braiding wheel, and following laying by means of a spiralising machine. The impregnation by heating the hollow profile to a temperature that is equal to or above the softening temperature of the matrix material and below the cross-linking temperature of the matrix material (method step ii.) which follows method step i. serves to wet the continuous fibres with the matrix material or to pre-compress continuous-fibre semifinished products that have already been pre-impregnated with the thermosetting matrix material.

Before the hollow profile is cut to size and removed from the production line (method step iv.), the hollow profile is to be cooled to a temperature below the softening temperature of the matrix material (method step iii.). The cooling can be carried out actively or passively.

In a further preferred embodiment of the method according to the invention, a thermosetting 1-component (1-C) system is used as the matrix material, which system consists of an epoxy resin and a secondary amine as the curing agent. The secondary amine is particularly preferably selected from one of the compounds imidazole, an imidazole derivative or a complex of general formula $MeL_4X_2$, Me being a divalent metal cation selected from copper, cobalt, nickel and zinc, L being a ligand selected from imidazole and an imidazole derivative, and X being an anion selected from fluoride, chloride, bromide, iodide and nitrate. 1C-systems denote compositions that contain all the constituents relevant for a curing reaction in just one component. Laborious mixing of the constituents can thus be omitted. The softening temperature of the epoxy resin is below the cross-linking temperature of the matrix. The cross-linking temperature is the temperature at which the curing reaction between the epoxy resin and the latent curing agent is triggered. The matrix material described is advantageously a 1-C system that is solid at room temperature and that is very easy to process when in powder form.

In a further preferred embodiment of the method, metal or plastics material is used as the material for the sleeve-like liner that forms the inner lateral surface of the hollow profile and to which the reinforcing-fibre laminate is applied. When plastics material is used, the softening temperature of the plastics material is particularly preferably higher than the curing temperature of the thermosetting matrix of the hollow profile. When a metal liner is used, the melting temperature of the metal is likewise particularly preferably higher than the curing temperature of the thermosetting matrix of the hollow profile. The liner can thus be used not only as a supporting element but also as an inner die in further method steps.

Manufacturing the hollow profile on a liner as the inner lateral surface advantageously makes it possible to omit demoulding of the profile from a core. In the region intended for applying a load to the structural element consisting of the hollow profile and the load-application element, the liner must be removed from the inner lateral surface of the hollow profile (method step b.). This is necessary because, in the load-application region, the reinforcing-fibre laminate is to be moulded in a form-fitting manner onto the load-application element arranged inside the hollow profile in this region. In a further preferred embodiment of the method according to the invention, the liner is removed by means of boring or gouging.

In a further preferred embodiment of the method according to the invention, the load-application element is arranged in the inner region of the hollow profile intended for the load application in such a way that, in the inner region of the hollow profile that is not intended for the load application, the load-application element and the liner of the hollow profile form a continuous surface to which pressure can be applied. Advantageously, no additional inner die is required as a result.

In a further preferred embodiment of the method according to the invention, the hollow profile is encased in a thermally contractible covering that contracts under the action of heat. The encasing process can be carried out following method step a. or b. or c. of the method according to the invention.

In a further preferred embodiment of the method according to the invention, the process of encasing the hollow profile in a thermally contractible covering is carried out following one of method steps i. or ii. or iii. or iv. of the method according to the invention.

In a further preferred embodiment of the method according to the invention, the process of encasing the hollow profile in a thermally contractible covering is carried out following method step i. When method step ii. is carried out, heating of the hollow profile to a temperature that is equal to or above the softening temperature of the matrix material and below the cross-linking temperature of the matrix material subsequently results in a first thermal contraction of the covering until it rests exactly on the outer lateral surface of the hollow profile. In this case, the covering contracts only over a small portion of the maximum shrinkage range; by far the major portion of the maximum shrinkage range is available for activation in subsequent method steps. The covering advantageously functions as an outer contour-stabilising element for the hollow profile while method step ii. is being carried out.

In one embodiment of the method according to the invention, the thermally contractible covering of the hollow profile is a shrink ring, shrink film and/or heat shrink tubing.

In a further embodiment of the method according to the invention, the thermally contractible covering is applied to the outer lateral surface of the hollow profile by means of a spiralising machine.

In a further preferred embodiment of the method according to the invention, the contraction of the covering by heating is used to exert a radially inwardly oriented pressure on the reinforcing-fibre laminate of the hollow profile, for the purpose of the consolidation thereof, in the region of the structural element that is not intended for the load application, i.e. in the region in which no load-application element is arranged. For this purpose, the structural element is heated at least to the cross-linking temperature of the matrix material, particularly preferably to the temperature range above the cross-linking temperature, at which the covering has a greater shrinkage range. At the same time as the heating, the pressure required for the consolidation is applied by means of the shrinkage of the covering that is triggered by the heating. An advantage of this embodiment is that it does not require an additional outer die for the consolidation.

The liner of the hollow profile can particularly preferably be used as the inner die for the consolidation if the softening or melting temperature of the liner material is higher than the cross-linking temperature of the matrix material, the liner thus retaining its stability during the consolidation. If the softening or melting temperature of the liner material is lower than the cross-linking temperature of the matrix material, the region of the structural element that is not intended for the load application can be supported by means of a core that is adapted to the inside dimensions of the hollow profile.

The consolidation pressure can also be applied, in addition to or without using a thermally contractible covering, by means of applying pressure to the liner in the inner region of the hollow profile, for example by means of a blow pin, while supporting the outer region using an outer die.

In the region of the structural element intended for the load application, i.e. the region in which the load-application element is arranged in the hollow profile, in order to functionalise the structural element it is necessary to heat the structural element at least to the cross-linking temperature of the matrix material and to apply a radially inwardly oriented pressure in order to consolidate the reinforcing-fibre laminate of the hollow profile in the load-application region and to mould it onto the load-application element. In this case, the load-application element functions as the inner die.

In preferred embodiments of the method according to the invention, the radially inwardly acting pressure on the structural element in the region intended for the load application can be applied by means of a pressure diaphragm or by means of a divided die or by means of a divided die and a sleeve to be formed.

The method variant using a pressure diaphragm is based on the method of external high-pressure forming but requires lower pressures (<20 bar). The pressure is transferred from an outer forming tool to a pressure diaphragm by means of a transfer medium. Advantages of this embodiment are that there is no need for a die which has to be adapted, and furthermore a high forming force can be applied and tolerance compensation is possible in a wide range. Moreover, moulding onto various undercut geometries of the load-application element can be carried out in any desired directions.

In the method variant of pressing using a divided outer die, the contour of the die must correspond to the contour of the load-application element including the undercuts thereof. Using a divided die advantageously makes it possible to apply a high forming force and to achieve a precisely defined outer contour. However, owing to the division of the die, there is a risk that parts of the hollow profile may jam in the parting planes of the tool.

The method variant of pressing by means of a divided outer die and using a formable sleeve prevents parts of the hollow profile from being jammed in the parting planes of the die.

In a further preferred embodiment of the method according to the invention, the radially inwardly acting pressure on the structural element for the consolidation and functionalisation thereof is applied in the region intended for load application by means of thermal contraction of the covering. Advantageously, this method variant is particularly simple to implement in technical terms, and no additional tool costs are incurred. However, the variant can be applied only in the case of simple undercut geometries in the peripheral direction.

In the case of a structural element that is produced using the method described above and comprises a hollow profile made of continuous fibre-reinforced plastics material that comprises a thermosetting matrix material that has a softening temperature that is below the cross-linking temperature, and at least one load-application element, the hollow profile and the load-application element are interconnected in a form-fitting manner. In this case, the hollow profile is moulded onto the contour of the load-application element.

In a preferred embodiment, the hollow profile of the structural element according to the invention has an annular cross section.

In a further preferred embodiment, the load-application element of the structural element according to the invention has a undercuts.

The proposed method particularly advantageously makes it possible to produce highly loaded thermosetting components using comparatively simple mechanical and process engineering and without complex metering and injection technology. Process windows can be set in wide boundaries. A die covering the entire length of the structural element is not required in order to consolidate and functionalise the structural element consisting of the hollow profile and the load-application element.

Advantages of the structural element according to the invention that is produced by means of the method according to the invention are disruption-free load application without adhesive connections that are difficult to monitor with respect to quality, and without the need to machine the hollow profile. Significant design freedom is possible when selecting possible undercut geometries, and therefore the structural element according to the invention has a wide range of applications.

BRIEF DESCRIPTION OF THE DRAWINGS

The invention will be explained in the following by way of embodiments and with reference to a plurality of drawings, but without being restricted thereto. In the drawings.

DETAILED DESCRIPTION OF THE PREFERRED EMBODIMENTS

Figure 1:
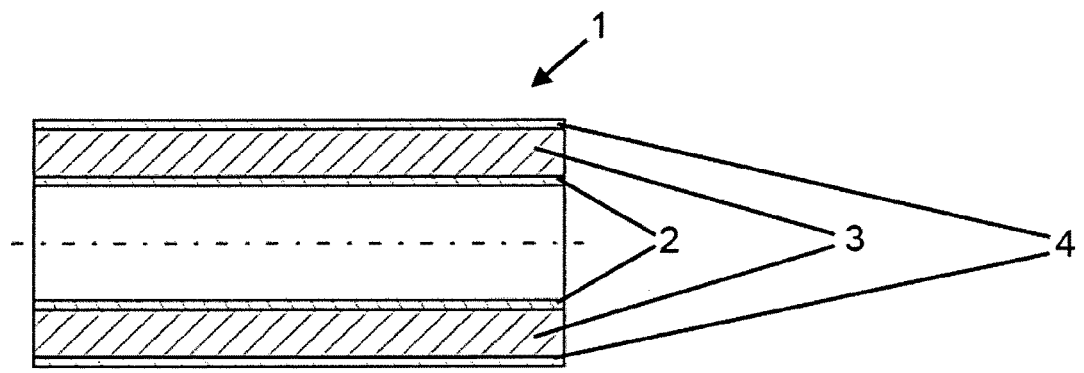
FIG. 1 is a longitudinal section through a hollow profile produced by means of method steps according to the invention.

FIG. 1 is a longitudinal section through a hollow profile 1 that is processed, as a semifinished product, in further method steps in order to produce a structural element. The hollow profile 1 is preferably in the shape of a hollow cylinder. The supporting, inner lateral surface is formed by a thin metal or plastics liner 2. A layer of continuous fibre-reinforced plastics material 3 is located on the liner 2. The reinforcing fibres extend in the longitudinal direction, for axially reinforcing the profile 1, and in any non-axial directions for off-axis reinforcement of the profile 1.

The reinforcing-fibre laminate 3 comprises a thermosetting B-stage matrix consisting of an epoxy resin and a secondary amine, preferably imidazole or an imidazole derivative. In this case, B-stage means that the softening temperature of the epoxy resin is below the cross-linking temperature of the epoxy resin and curing agent. The outer lateral surface of the hollow profile 1 forms a shrink ring 4 that is shrunk precisely onto the reinforcing-fibre laminate layer 3 by means of a first heating process. The hollow profile 1 is processed to form the structural element 14 according to the invention in subsequent method steps.

Figure 2:
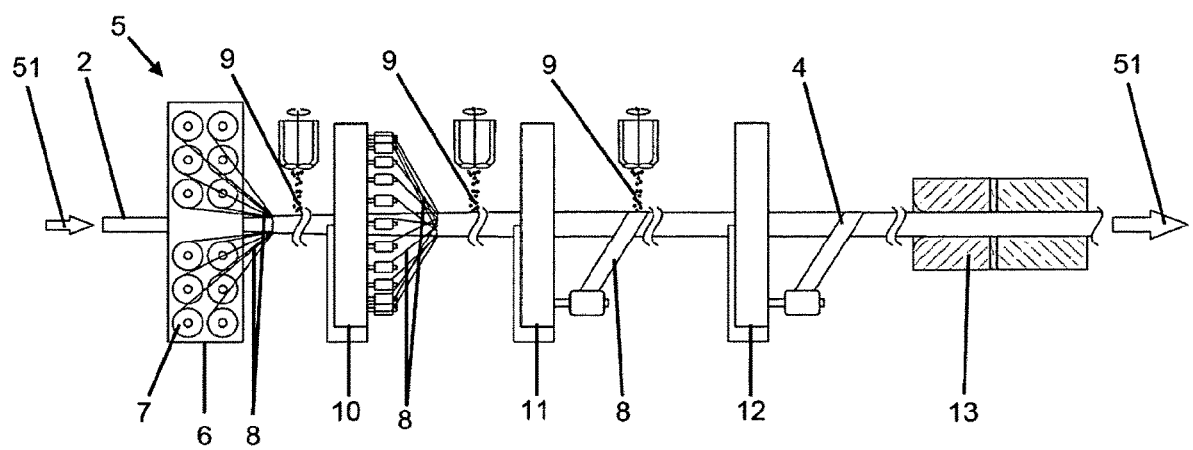
FIG. 2 shows a detail of a process chain for continuous manufacture of a hollow profile.

FIG. 2 shows a detail of a production line 5 for continuous manufacture of a hollow profile 1. The process chain is shown from the liner 2 being fed, through various steps of machining the hollow profile blank and a shrink ring 4 being wrapped around said blank, up to the hollow profile blank being impregnated using a heated tool 13. The profile 1 subsequently being drawn off, and the cutting to size and removal from the production line 5 are not illustrated in the process chain shown.

Continuous fibres or rovings 8 are drawn off the coils 7 of a creel 6, in the machine direction 51, and laid on the liner 2 in the axial direction. Subsequently, the matrix material 9 that is solid at room temperature is applied in powder form to the blank, i.e. in this case the liner 2 coated with axial reinforcing fibres. In the following step, the blank passes through a braiding wheel 10, by means of which the braided rovings 8 are laid on the axial reinforcing fibres so as to extend in any desired direction. Off-axis reinforcement of the hollow profile 1 is thus achieved. The blank is then sprinkled with powdered matrix material 9. Further off-axis reinforcement is carried out using a spiralising machine 11 from which rovings 8 are laid on the blank so as to be at a specified angle relative to the profile axis. The blank is then again sprinkled with powdered matrix material 9.

In a following method step, the blank is encased, in a continuous manner, in a shrink ring 4 by means of a shrink ring spiralising machine 12.

The impregnation, i.e. the fibre infiltration by means of the matrix material, takes place in a subsequent method step by means of the blank being drawn through a heated tool 13. In this case, the blank is heated to a temperature that is equal to or above the softening temperature of the resin of the matrix material 9 but below the cross-linking temperature of the matrix material 9.

As a result of the action of heat, the shrink ring 4 shrinks precisely onto the outer lateral surface of the hollow profile blank and thus functions as an outer contour-stabilising element during the impregnation.

For further processing (not shown here) of the hollow profile manufactured constantly and continuously, as described, the hollow profile blank is first cooled to a temperature that is below the softening temperature of the matrix material 9. The cooling may be carried out entirely passively by means of the dwell time of the hollow profile blank in the production line 5 following the heated tool 13 being at least equal to or longer than the cooling time. The cooling can also be actively accelerated, for example by spraying the blank with cooled air. After the blank has been cooled, it is cut to size to the intended length and removed from the production line 5.

Figure 3:
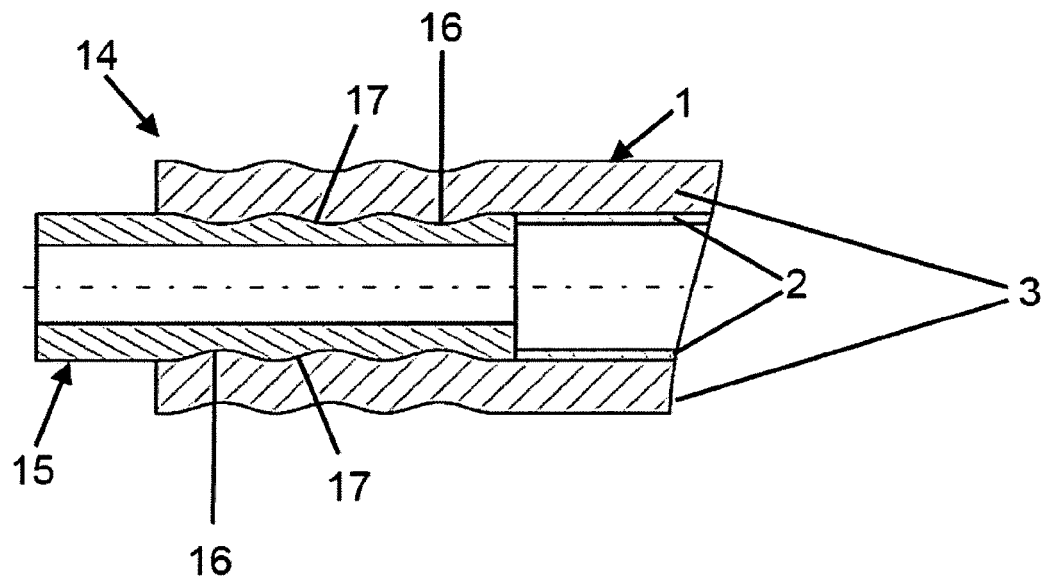
FIG. 3 shows a structural element according to the invention.

FIG. 3 is a longitudinal section of a structural element 14 according to the invention, consisting of a continuous fibre-reinforced hollow profile 1 and a load-application element 15. The load-application element 15 may comprise undercuts 16. In the load-application region 17, the liner 2 of the hollow profile 1 was removed, preferably by means of boring or gouging, prior to functionalising the hollow profile 1 in order to form the structural element 14. In the load-application region 17, a form-fitting connection exists between the reinforcing-fibre laminate 3 and the load-application element 15.

FIG. 4 shows variants a to d of the method step of consolidating and functionalising the structural element 14, consisting of the hollow profile 1 and the load-application element 15, in the load-application region 17. The aim of the functionalisation is to mould the hollow profile 1 onto the load-application element 15 in the load-application region 17 in order to establish a form-fitting connection. For this purpose, the structural element 14 has to be heated to the cross-linking, and thus the curing, temperature of the matrix of the reinforcing-fibre laminate 3, and furthermore a radially inwardly oriented consolidation and forming pressure has to be applied to the hollow profile 1 in the load-application region 17.

In all the method steps, the load-application element 15 functions as the inner die. The selection of the method variants must be adjusted, in each individual case, to the geometry of the structural element 14 and is for example dependent on the thickness of the reinforcing-fibre laminate 3, the shape of the undercuts 16, and the fibre orientation.

Figure 4A:
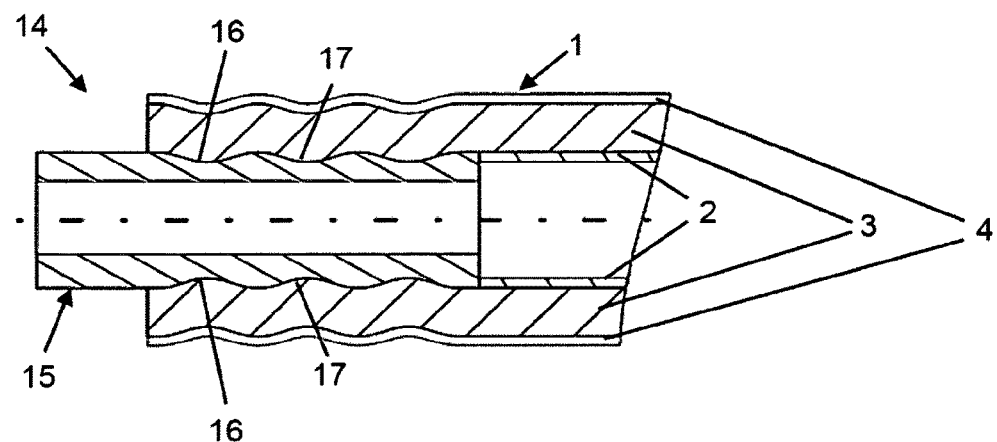
FIGS. 4a to 4d illustrate embodiments for applying a consolidation and functionalisation pressure in the load-application region of a structural element.

FIG. 4a shows the application of a consolidation and forming pressure in the load-application region 17 by means of thermal contraction of a shrink ring 4. The thermal contraction of the shrink ring 4 can likewise exert pressure for consolidating the hollow profile 1 as part of the structural element 14 in the region not intended for the load application.

Figure 4B:
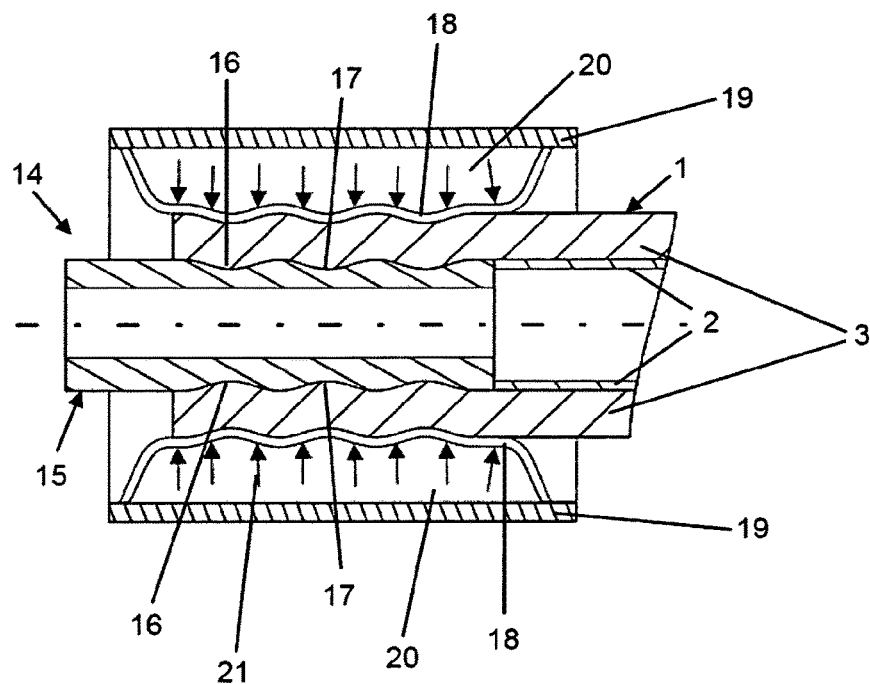

FIG. 4b shows the application of a radially inwardly oriented consolidation and forming pressure 21 in the load-application region 17 by means of a pressure diaphragm 18. In these method variants that are based on external high-pressure forming, the pressure is transferred from a forming tool 19 to the pressure diaphragm 18 by means of a transfer medium 20, such that the hollow profile 1 is moulded onto the load-application element 15, functioning as the inner die, in the load-application region 17.

Figure 4C:
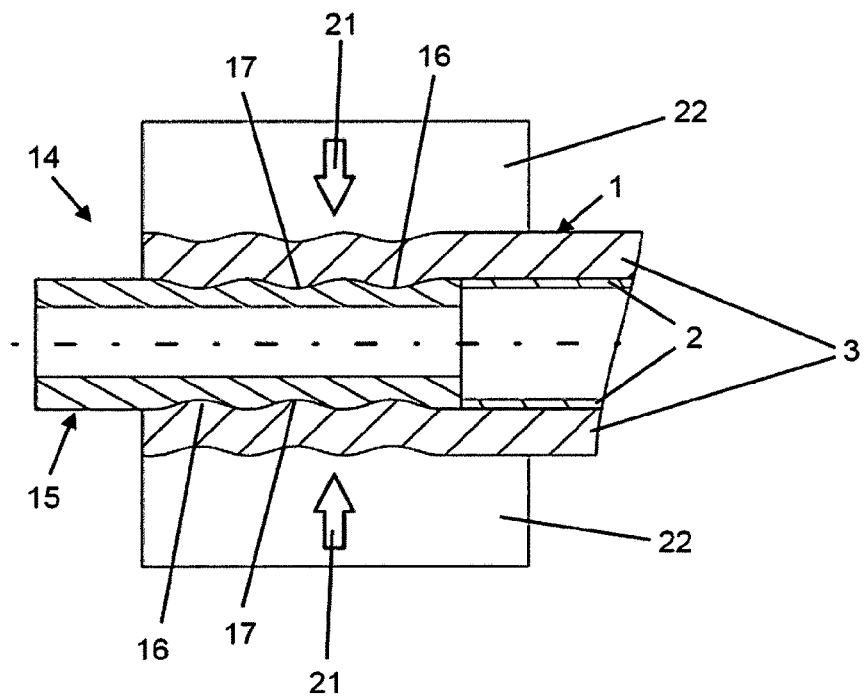

FIG. 4c shows the application of a radially inwardly oriented consolidation and forming pressure 21 in the load-application region 17 by means of pressing using a divided die 22. In this case, the contour of the die has to correspond to the contour of the load-application element 15, including the undercuts 16 thereof.

Figure 4D:
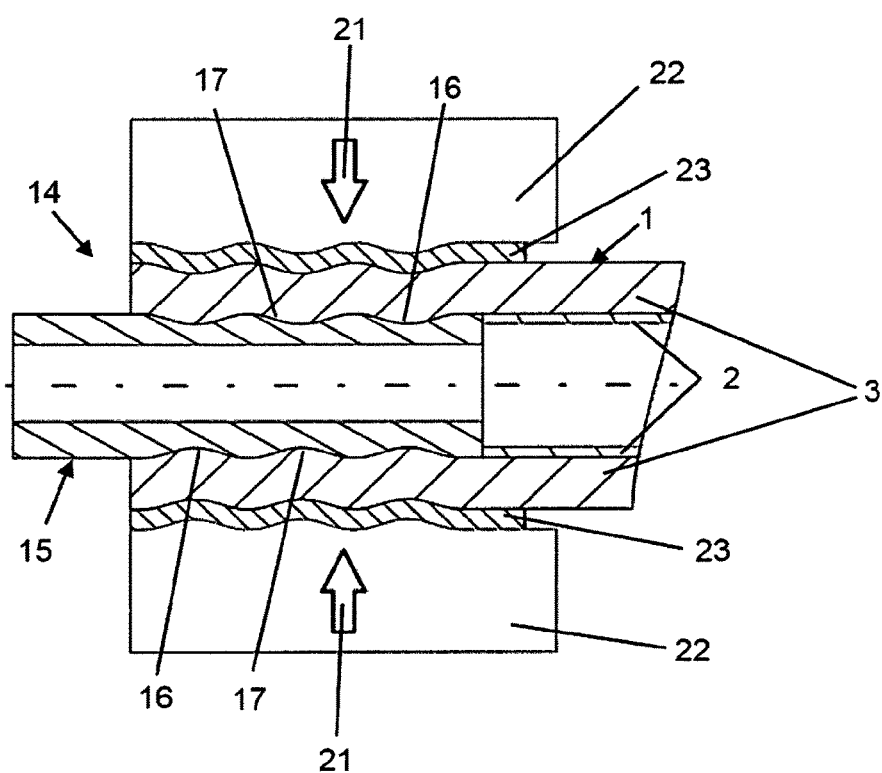

FIG. 4d shows the application of a radially inwardly oriented consolidation and forming pressure 21 in the load-application region 17 by means of pressing using a divided die 22 over a sleeve 23 to be formed. Compared with the method variant shown in FIG. 4c, using the sleeve 23 prevents parts of the hollow profile 1 from jamming in the parting planes of the divided die 22.

LIST OF REFERENCE NUMERALS 1 hollow profile
2 liner
3 reinforcing-fibre laminate
4 heat shrink tubing
5 production line
51 machine direction
6 creel
7 coil
8 roving
9 matrix material
10 braiding wheel
11 spiralising machine
12 shrink ring spiralising machine
13 heated tool
14 structural element
15 load-application element
16 undercut of the load-application element
17 load-application region
18 pressure diaphragm
19 forming tool
20 pressure transfer medium
21 pressure direction
22 divided die
23 sleeve

The invention claimed is:

1. A method for producing a structural element (14) comprising a hollow profile (1) made of continuous fibre-reinforced plastics material (3) that comprises a thermosetting matrix material (9) that has a softening temperature that is below a cross-linking temperature of the thermosetting matrix material, and at least one load-application element (15), wherein the method comprises at least the following method steps:
   a. providing a cut-to-size hollow profile (1) made of plastics material (3) that is reinforced by continuous fibres, on a liner (2), which is part of the structural element, wherein the liner (2) forms an inner lateral surface of the hollow profile (1), and wherein the hollow profile (1) is impregnated by heating said hollow profile to a temperature that is equal to or above the softening temperature of the matrix material (9) and below the cross-linking temperature of the matrix material (9);
   b. removing the liner (2) in an inner region (17) of the hollow profile (1) that is intended for load application;
   c. arranging a load-application element (15) on the inner region (17) of the hollow profile (1) that is intended for load application;
   d. consolidating and functionalising the structural element (14) by heating the structural element (14) to a temperature that is equal to or above the cross-linking temperature of the matrix material (9) and applying a radially inwardly acting pressure to the structural element (14), wherein the hollow profile (1) is moulded onto the load-application element (15) in a form-fitting manner.

2. The method according to claim 1, characterised in that providing the hollow profile (1) according to method step a. comprises at least the following method steps:
   i. manufacturing a hollow profile (1) made of plastics material (3) that is reinforced by continuous fibres, on a liner (2), the liner (2) forming the inner lateral surface of the hollow profile (1);
   ii. heating the hollow profile (1) to a temperature that is equal to or above the softening temperature of the matrix material (9) and below the cross-linking temperature of the matrix material (9);
   iii. cooling the hollow profile (1) to a temperature below the softening temperature of the matrix material (9);
   iv. cutting the hollow profile (1) to size and removing it from a production line (5).

3. The method according to claim 2, characterised in that the hollow profile (1) is manufactured by laying continuous fibres or continuous-fibre semifinished products, pre-impregnated with the matrix material (9), on the liner (2).

4. The method according to claim 2, characterised in that the hollow profile (1) is manufactured in a continuous manner, the matrix material (9) being fed to the continuous fibres (8) laid on the liner (2).

5. The method according to claim 4, characterised in that the matrix material (9) is fed to the continuous fibres (8) via an application of powdered resin or via an injection of resin.

6. The method according to claim 2, characterised in that the hollow profile (1) is encased in a thermally contractible covering (4) following one of method steps i. or ii. or iii. or iv.

7. The method according to claim 6, characterised in that the process of encasing the hollow profile (1) in a thermally contractible covering (4) is carried out following method step i., method step ii. subsequently being carried out such that the hollow profile (1) is heated to a temperature that is equal to or above the softening temperature of the matrix material (9) and below the cross-linking temperature of the matrix material (9), wherein a first thermal contraction of the covering (4) takes place until said covering rests on the outer lateral surface of the hollow profile (1).

8. The method according to claim 1, characterised in that the hollow profile (1) is encased in a thermally contractible covering (4) following one of method steps a. or b. or c.

9. The method according to claim 8, characterised in that the covering (4) of the hollow profile (1) comprises a shrink ring.

10. The method according to claim 8, characterised in that the covering (4) of the hollow profile (1) is applied to an outer lateral surface of the hollow profile (1) via a spiralising machine (12).

11. The method according to claim 8, characterised in that the radially inwardly acting pressure on the structural element (14) for the consolidation thereof is applied in a region not intended for load application via thermal contraction of the covering (4).

12. The method according claim 8, characterised in that the radially inwardly acting pressure on the structural element (14) for the consolidation and functionalisation thereof is applied in a region (17) intended for load application via thermal contraction of the covering (4).

13. The method according to claim 8, characterised in that the covering (4) of the hollow profile (1) comprises a shrink film.

14. The method according to claim 8, characterised in that the covering (4) of the hollow profile (1) comprises heat shrink tubing.

15. The method according to claim 1, characterised in that the radially inwardly acting pressure on the structural element (14) for the consolidation and functionalisation thereof is applied in a region (17) intended for load application via a pressure diaphragm (18).

16. The method according to claim 1, characterised in that the matrix material (9) is a thermosetting 1-component system comprising an epoxy resin and a secondary amine as the curing agent.

17. The method according to claim 1, characterised in that, in order to manufacture the hollow profile (1), continuous fibres (8) are laid on the liner (2) in a continuous manner via a creel (6).

18. The method according to claim 1, characterised in that the liner (2) is comprised of metal or plastics material, the melting temperature of the metal or the softening temperature of the plastics material being higher than the cross-linking temperature of the matrix material (9).

19. The method according to claim 1, characterised in that the liner (2) is removed from an inner lateral surface of the hollow profile (1), in an inner region (17) of the hollow profile (1) that is intended for load application, via boring or gouging.

20. The method according to claim 1, characterised in that the load-application element (15) is arranged in the inner region (17) of the hollow profile (1) intended for the load application in such a way that the load-application element (15) and the liner (2) of the hollow profile (1) form a continuous surface to which pressure can be applied.

* * * * *